Nov. 24, 1931.  H. L. F. TREBERT  1,833,448
BRAKE MECHANISM
Filed Feb. 26, 1926  2 Sheets-Sheet 2
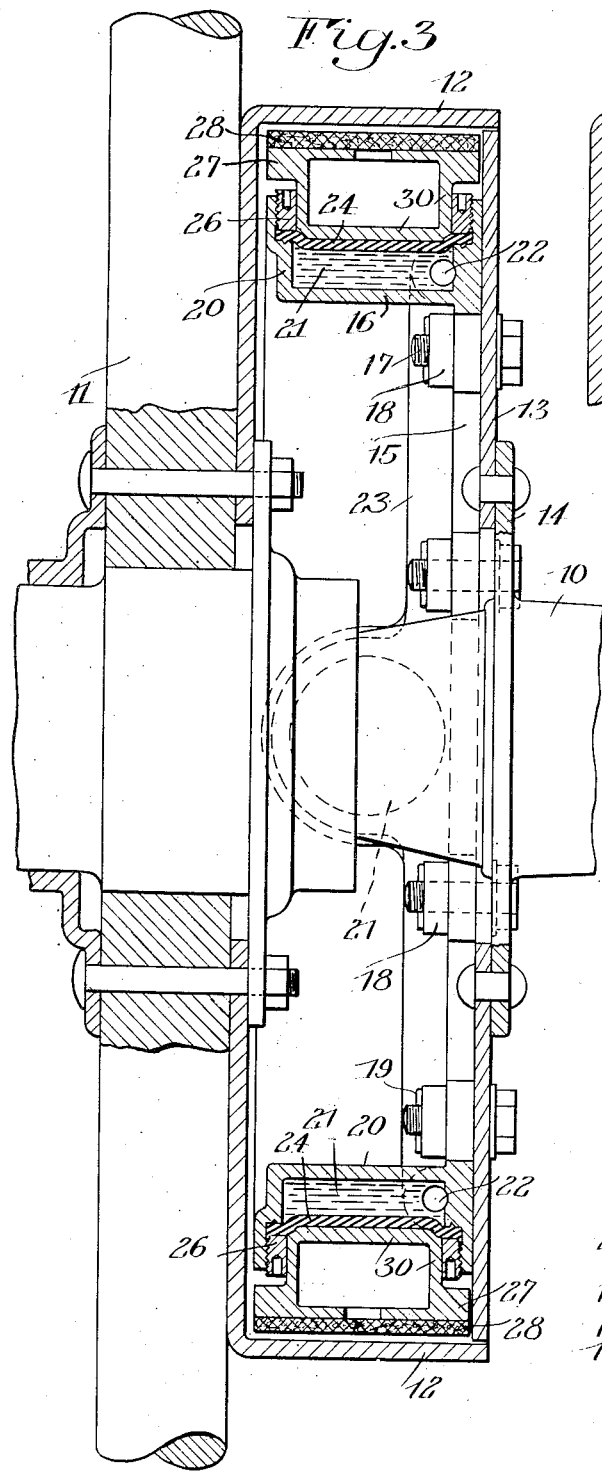
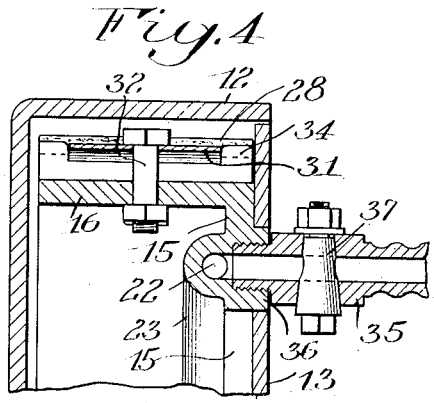
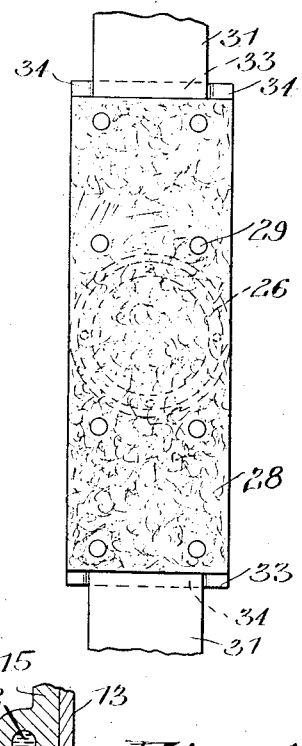
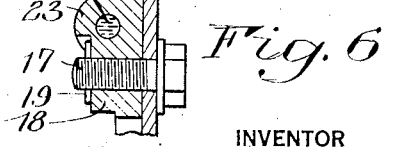
INVENTOR
Henry L. F. Trebert
BY
his ATTORNEYS Patented Nov. 24, 1931

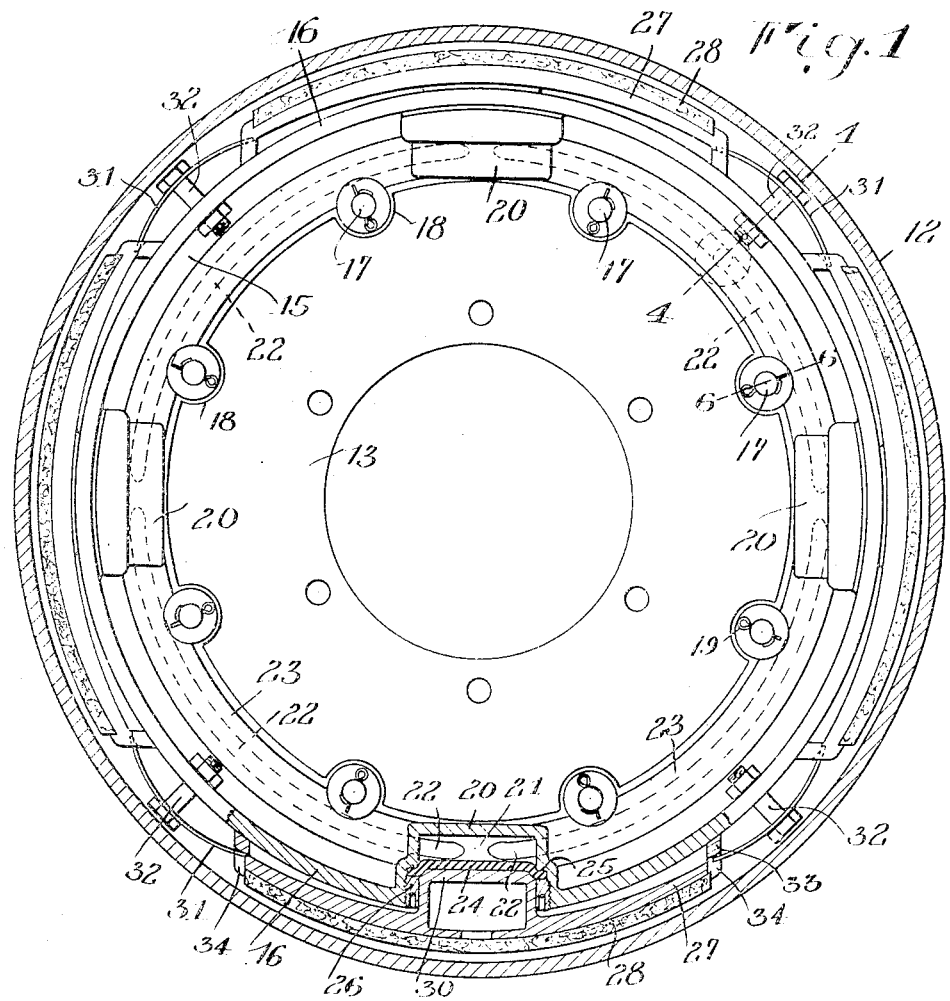
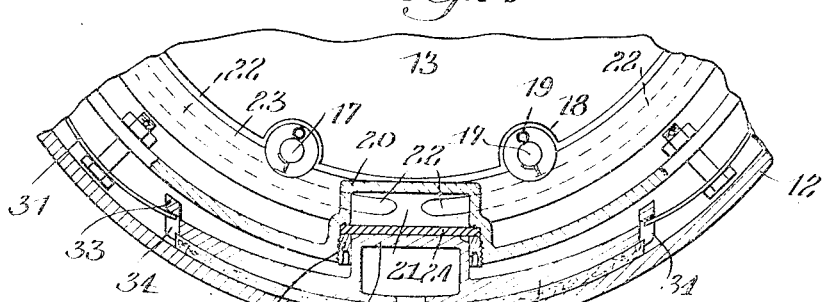

1,833,448

UNITED STATES PATENT OFFICE

HENRY L. F. TREBERT, OF CANANDAIGUA, NEW YORK

BRAKE MECHANISM

Application filed February 26, 1926. Serial No. 90,767.

The present invention relates to brake mechanism and has for its object, more particularly, to provide an improved hydraulic or fluid pressure brake for motor driven vehicles or other power driven machines.

Another object of the invention is to provide a durable, efficient and simplified form of brake which can be manufactured at a relatively low cost and maintained in operation with but comparatively little expense.

A further object of the invention is to provide an improved brake applicable to motor driven vehicles and other power driven machines wherein the braking elements are moved radially of the axis of the driven element by improved brake applying means.

To these and other ends the invention resides in certain improvements and combinations of parts, all as will be hereinafter more fully described, the novel features being pointed out in the claims at the end of the specification.

In the drawings:—

Figure 1 is a part sectional elevation embodying one form of the invention with the brake shoes shown in a release position;

Figure 2 is a fragmentary sectional elevation showing one of the shoes in braking position;

Figure 3 is a sectional elevation illustrating on an enlarged scale the application of the brakes as applied to a motor driven vehicle;

Figure 4 is a sectional elevation taken on the line 4—4 of Figure 1;

Figure 5 is a plan view looking at the outer face of one of the brake shoes; and Figure 6 is a fragmentary section taken on line 6—6 of Figure 1.

Similar reference numerals throughout the several views indicate the same parts.

Referring to the drawings, 10 represents an axle or axle housing of a motor driven vehicle and 11 one of the wheels thereon, both of which may be of any well known construction. A brake drum 12 is bolted or otherwise secured to the wheel and a disk-shaped closure 13 for the drum is riveted or otherwise secured to a flange 14 on the axle or axle housing 10, as shown in Figure 3.

The closure and supporting flange 14, together with the axle, constitute a support for the brake shoes and the operating devices therefor as will hereinafter appear. Secured to the inner face of the closure is a frame, preferably of angular construction and including a vertically disposed web or flange 15 from which projects toward the wheel an annular flange 16. The flange 15 is connected to the closure preferably by a series of stud bolts 17 extending through lugs 18 of said flange, as shown in Figures 1 and 6, the studs being prevented from working loose preferably by the cotter pins 19.

The annular flange 16 is provided with a series of containers or cup-shaped members 20 projecting inwardly thereof and disposed radially or transversely of the axis of the drum to afford fluid pressure chambers 21 communicating one with another through the passages 22 in a series of conduits or annular tube-like members 23 which are preferably cast integral with the vertically disposed flange 15, as shown in Figures 4 and 6. The fluid pressure chambers 21 are closed at their outer sides by flexible walls or diaphragms 24 which may be formed of any suitable material and which normally occupy the position shown in Figures 1 and 3. The diaphragms have their peripheral edge portions resting upon annular seats or shoulders 25 of the containers 20 and are preferably secured thereon by clamping rings 26 threaded into the containers, as shown in Figure 3.

A brake shoe is provided opposite each of the diaphragms, the shoes proper comprising the annular or arcuate portions 27 having the lining portions 28 secured thereto preferably by a suitable number of rivets 29, as shown in Figure 5. The portions 27 are provided with centrally disposed operating members 30 of cylindrical form which engage the outer faces of the diaphragms 24 and which fit closely within and are guided by the clamping rings 26, so as to be held against creeping or movement circumferentially of the drum when the brakes are applied. The clamping rings, therefore, form bearings for the inwardly extending portions of the shoes whereby the shoes are caused to move radially or transversely of the axis of the drum when the pressure in the fluid chambers is increased sufficiently to force the diaphragms outwardly to the brake applying position indicated in Figure 2. The cylindrical portions 30 of the shoes are preferably cast or otherwise integrally formed thereon but may constitute one or more separate parts if preferred having any desired shape and suitably arranged between the shoes and diaphragms to afford the desired results.

The shoes are preferably spaced apart at their ends to receive the springs 31 or other suitable means by which they are released upon relieving the pressure in the chambers 21. The springs are preferably of the flat or leaf type and are suitably secured and tensioned by bolts 32 which are connected with the container supporting flange 16, as shown in Figures 1 and 4. The springs are disposed between the shoes and are adapted to engage the adjacent ends thereof being disposed upon the inwardly extending lugs 33 of the shoes which carry at their opposite ends upstanding guide portions 34 for holding the springs in alignment with the shoes. The lugs 33 normally rest upon the annular flange 16, as shown in Figure 1, being held thereon by the action of the springs.

A coupling or conduit connection 35 is screwed into a slightly extended portion 36 of the vertical flange 15, as shown in Figure 4 and is arranged for connection with a supply conduit not shown, whereby fluid is supplied to the passages 22 and containers 20. The portion 36 of the flange 15 is preferably disposed within an opening formed in the brake drum closure and is adapted to receive said coupling as shown in Figure 4.

The conduit may be connected with a suitable fluid supply source, not shown, under the control of the operator or driver of the vehicle with means by which to increase the pressure in the chambers 21 when it is desired to apply the brakes, this mechanism being of any preferred or well known construction.

Valves 37 are carried by the couplings 35 for cutting off the supply of fluid to the individual brakes so that in case any one of the brakes becomes defective or inoperative it can be quickly cut out without interfering with the operation of the remaining brakes of the system.

The term "brake drum" as employed herein is used in its broadest sense and it will be understood that it is intended to be broad enough to cover any revoluble power driven element to which it may be desired to apply a braking force with the idea of checking its speed or preventing its operation.

It will be further understood that the construction of the brake shoes and the operating portions thereof lying between the diaphragms and the shoes proper may be varied if desired within the scope of the claims and that the manner of constructing and securing the diaphragms may also be varied without departing from the spirit of the invention as expressed in the claims.

What I claim is:—

1. In a brake mechanism, a revoluble brake drum, a support at one side of the drum including an annular member having a plurality of fluid pressure containers connected by passages formed in the annular member, each of the containers including diaphragms adapted to move transversely of the axis of the drum having centrally disposed portions directly opposite and brake shoes within the drum adapted to be actuated by said expansible portions and being disposed outwardly of and adapted to rest upon the annular member.

2. In a brake mechanism, a revoluble brake drum, an annular support therein, a plurality of brake shoes interposed between the support and the drum, fluid containers disposed inwardly of the shoes and including pressure responsive members engaging the central portions of the shoes whereby to move the shoes into engagement with the drum, release springs for the shoes interposed between the ends thereof and a support for each spring engaging the latter between its ends.

3. In a brake mechanism, a revoluble brake drum, supporting means therein, a plurality of fluid pressure containers within the drum carried by the supporting means and each having a diaphragm at one side thereof and a plurality of separate brake shoes within the drum having spaced portions normally engaging the supporting means and provided with central portions engaging the diaphragms whereby upon expansion of the latter the shoes are moved into engagement with the drum.

4. In a brake mechanism, a revoluble brake drum, a support at one side thereof including an annular member projecting into the drum and having a plurality of fluid containers disposed thereon and each including an expansible wall movable transversely of the axis of the drum, a plurality of brake shoes operatively associated with said walls and having spaced portions normally resting upon the annular member and a fluid supply conduit communicating with said containers.

5. In a brake mechanism, a revoluble brake drum, a support at one side thereof including an annular member having a plurality of fluid containers disposed within the drum and each including an expansible wall movable transversely of the axis of the drum, a plurality of brake shoes operatively associated with said walls, a fluid supply conduit communicating with said containers and a plurality of release springs for the shoes connected with the annular member and each having its opposite ends engaging two of the shoes.

6. In a brake mechanism, a revoluble brake drum, a support at one side thereof, an annular member detachably connected with the support and having a plurality of fluid holding chambers each closed at one side by a diaphragm, said annular member having fluid supply passages leading to the several chambers, clamping rings for the diaphragms, brake shoes disposed opposite each of the diaphragms and having a laterally extending portion slidable within the rings and adapted to be operated by the diaphragms and release means for the shoes.

7. In a vehicle brake system, the combination with a wheel having a flanged brake drum and an axle having a support at one side of the drum, a ring-shaped member projecting from the support into the drum a plurality of brake shoes within the drum between the flanged portion of the latter and said ring arranged for movement radially of the axis of the drum and having portions normally resting upon the ring-shaped member and fluid pressure controlled means for moving the shoes into engagement with the drum.

8. In a vehicle brake system, the combination with a wheel having a brake drum and an axle having a support at one side of the drum including an annular flange projecting into the drum, of a plurality of brake shoes within the drum arranged for movement radially of the axis thereof and having their ends normally resting upon the flange, fluid pressure means for operating the shoes including pressure controlled diaphragms and means for conveying fluid under pressure to the diaphragms.

9. In a vehicle brake system, the combination with a wheel having a brake drum and an axle having a support at one side of the drum, an annular member projecting into the drum from said support, a plurality of brake shoes within the drum having their ends normally resting upon the annular member, means yieldably holding said ends thereon, fluid pressure operating means for the shoes including fluid holding chambers each having a diaphragm at one side thereof arranged to move transversely of the axis of the drum whereby to move the shoes into engagement with the drum and means for supplying fluid to said chambers.

10. In a brake mechanism, a revoluble brake drum, a closure for the drum a plurality of fluid containers within the drum each including an expansible wall portion arranged to be fluid pressure operated and to move radially of the axis of the drum, an annular supporting member for the containers secured upon the closure, a brake shoe interposed between each expansible wall portion and the drum, the shoes being substantially centered with respect to said expansible wall portions for radial movement thereby into engagement with the drum and means for effecting release of the shoes upon reducing the pressure within the containers.

11. In a fluid pressure operated brake mechanism, a revoluble brake drum, a plurality of fluid containers within the drum each having a plurality of spaced openings each closed by a flexible wall arranged to expand in the direction of the drum under a predetermined pressure in the container, a brake shoe opposite each flexible wall having a portion intermediate its ends associated with the flexible wall for operation by the latter whereby the shoe is moved radially to brake applying position and release means for the shoes.

12. In a brake mechanism, a brake drum, a closure for one side of the drum, an annular member supported by the closure within the drum, a plurality of brake shoes interposed between the annular member and the drum, a guide formed on said annular member between the ends of each shoe to cause the latter to move radially when forced outwardly into engagement with the drum and means for effecting outward movement of the shoes.

13. In a brake mechanism, a brake drum, a closure for the drum, fluid pressure means comprising a plurality of radially disposed fluid holding containers secured within the drum upon the closure each having a metal diaphragm forming one of its walls, a brake shoe opposite each container having an inwardly extending portion resting upon the diaphragm whereby upon outward movement of the same the shoe will be moved into engagement with the drum, and means for releasing the shoes upon reduction of the pressure within the containers.

14. In a brake mechanism, a brake drum, a closure for the drum, fluid pressure means comprising a plurality of fluid holding containers secured within the drum upon the closure each having an expansible wall disposed radially of the axis of the drum, a fluid supply conduit within the drum communicating with the containers, a brake shoe opposite eacvh container having a centrally disposed operating portion resting upon the expansible wall of the container and spring means operating to release the shoes upon reducing the pressure within the containers.

HENRY L. F. TREBERT.